United States Patent [19]

Mueller et al.

[11] Patent Number: 4,979,527

[45] Date of Patent: Dec. 25, 1990

[54] STERILIZABLE VALVE ASSEMBLY FOR DISPENSING FLUID MATERIALS AND A METHOD OF OPERATING THE VALVE ASSEMBLY

[75] Inventors: Martin J. Mueller, Palm Harbor, Fla.; Martin Mueller, Wonder Lake, Ill.

[73] Assignee: Osgood Industries, Inc., Oldsmar, Fla.

[21] Appl. No.: 482,872

[22] Filed: Feb. 20, 1990

[51] Int. Cl.$^5$ .................. F16K 51/00; B08B 3/04; B08B 9/02

[52] U.S. Cl. .................. 137/15; 134/166 C; 134/168 C; 134/169 C; 137/240; 137/241; 137/613; 251/122; 251/331

[58] Field of Search ............. 73/863.84, 863.86; 134/166 C, 168 C, 169 C; 137/15, 238, 240, 241, 613; 251/121, 122, 331, 335.2; 222/148; 251/121, 122, 331, 335.2

[56] References Cited

U.S. PATENT DOCUMENTS

| | | | |
|---|---|---|---|
| 2,768,789 | 10/1956 | Frey | 137/613 |
| 2,981,660 | 4/1961 | Achorn, Jr. et al. | 137/240 |
| 3,308,847 | 3/1967 | Umann | 137/613 |
| 4,653,526 | 3/1987 | Hoiss | 134/166 C |
| 4,720,076 | 1/1988 | Hyde | 251/331 |
| 4,836,236 | 6/1989 | Ladisch | 251/331 |

*Primary Examiner*—George L. Walton
*Attorney, Agent, or Firm*—Dressler, Goldsmith, Shore, Sutker & Milnamow, Ltd.

[57] ABSTRACT

A valve assembly having a diaphragm valve configured for efficient cleaning and sterilization, and a method for operating the valve assembly in a manner controlling the fluid material flow therethrough and for effecting cleaning thereof. The valve assembly includes a valve body defining inlet and outlet ports. The diaphragm valve is operably arranged between the ports. An actuator mechanism selectively positions the diaphragm valve relative to a valve seat defined by the valve body. A selectively operated clamping mechanism arranged on one side of the diaphragm valve develops a clamping force which is used to seal the diaphragm valve against an annular sealing surface area defined by the valve body. A cleaning system arranged on an opposite side of the diaphragm valve facilitates internal cleaning of the valve assembly, including the diaphragm valve and the annular sealing surface area upon release of the clamping force acting against the diaphragm valve.

13 Claims, 1 Drawing Sheet

STERILIZABLE VALVE ASSEMBLY FOR DISPENSING FLUID MATERIALS AND A METHOD OF OPERATING THE VALVE ASSEMBLY

FIELD OF THE INVENTION

The present invention generally relates to a fluid flow valve assembly and, more particularly, to a diaphragm valve assembly particularly configured for efficient cleaning and sterilization, and to a method for operating the valve assembly in a manner controlling the fluid material flow therethrough and internal cleaning thereof.

BACKGROUND OF THE INVENTION

Valve assemblies using one or more diaphragm valves for controlling material flow between inlet and outlet ports are known. In such valve assemblies, a generally central portion of a diaphragm valve is flexed between open and closed positions to thereby control the fluid flow through the valve assembly.

Valve assemblies are commonly used for dispensing or otherwise controlling flow of fluid materials such as milk, ice cream, or the like food products. As will be readily appreciated, the ability to efficiently internally clean and sterilize the valve assembly is a primary concern when dealing with food products.

A typical diaphragm valve assembly includes a valve body defining inlet and outlet ports, the diaphragm valve operatively disposed between the inlet and outlet ports of the valve body, and an end cap or the like which seals the diaphragm valve to the valve body. To promote cleanliness and sterility, the valve body and end cap are formed from stainless steel and the diaphragm valve is formed from a suitably flexible material which readily lends itself to high temperatures and easy cleaning.

Although a cleaning medium (such as steam) can readily be directed through the material passages of a typical valve assembly, heretofore known valve assemblies ordinarily require substantially complete disassembly to effect internal cleaning and sterilization of the component parts. Disassembly of the valve assembly is particularly necessitated to insure cleaning and sterilization of an area wherein the diaphragm valve was sealed to the valve body.

As will be readily appreciated by those skilled in the art, a typical valve body design lacks an adequate flow of fluid material in the area wherein the diaphragm valve is sealed to or otherwise seated on the valve body. Therefore, even frequent internal cleaning and sterilization of the valve assembly may not properly retard bacterial growth and the like, which could lead to contamination of the food product passing through the valve assembly, and which could subsequently result in severe health problems. However, disassembly of the valve assembly for cleaning purposes is a time consuming process further involving substantial interruption of the production line.

SUMMARY OF THE INVENTION

The present invention provides a readily sterilizable valve assembly with a diaphragm valve and a method for operating the valve assembly in a manner controlling the fluid flow therethrough for effecting cleaning and sterilization. An improved feature of the present invention concerns its ability to internally clean and, if so desired, sterilize internal flow passages and an area wherein the diaphragm valve is sealed to a valve body of the valve assembly without requiring disassembly of the component parts comprising the valve assembly. Such features make the valve assembly of the present invention especially useful for dispensing fluid food materials.

In accordance with a presently preferred and illustrated embodiment, the valve assembly of the present invention is operable in either a dispensing mode of operation or a cleaning mode of operation. In the dispensing mode, the valve assembly is operated to control the flow of fluid materials therethrough. In the cleaning mode, the diaphragm valve is positioned to permit internal cleaning of the valve assembly, and in particular, the area where the diaphragm is seated against the valve body.

The present invention preferably includes a valve body defining an inlet port permitting entry of a fluid material into the valve body and an outlet port joined to the inlet port for exhausting fluid material from the valve body. A diaphragm valve is operably arranged between the inlet and outlet ports. An actuator mechanism selectively positions a center portion of the diaphragm valve relative to a valve seat to control flow of fluid material through the valve body.

A clamping mechanism selectively clamps the diaphragm valve against an annular sealing surface area surrounding the valve seat and defined by the valve body. Preferably, the clamping mechanism comprises a pneumatic apparatus which applies a clamping force against one side of the diaphragm valve in a manner sealing the diaphragm valve against the sealing surface area. In the illustrated form, the pneumatic apparatus includes an annular piston mounted within the valve assembly.

The present invention further includes a cleaning system for facilitating internal cleaning of the valve assembly. The cleaning system selectively permits a cleaning fluid to be applied from the side of the diaphragm which is opposite that to which the clamping force is applied. By this arrangement, automatic cleaning of the diaphragm valve and the sealing surface area against which the diaphragm valve is clamped can be effected upon release of the clamping force normally applied against the diaphragm valve.

To facilitate fabrication of the valve assembly, an end cap is fastened to the valve body and provides a suitable mounting arrangement for the actuator mechanism which positions the diaphragm valve relative to the valve body. The diaphragm valve is arranged between the end cap and valve body. The end cap further defines an annular chamber wherein the pneumatically actuated annular piston is arranged for applying a clamping force against one side of the diaphragm.

To further promote control of the fluid material flow through the valve body, the illustrated embodiment of the present invention further includes another diaphragm valve arranged within the valve assembly for selectively metering fluid flow between the inlet and outlet ports. This other diaphragm valve has an operator controlled mechanism operably associated therewith for positioning the second diaphragm valve relative to the valve body so as to meter the flow therethrough. However, it will be understood that the present invention can be readily embodied in valve constructions having either single or plural flexible diaphragm elements for effecting cleaning of the diaphragm and regions adjacent thereto.

The present invention is also directed to a method of operating a multipiece valve assembly including a valve body with an inlet port for receiving fluid material and an exhaust port joined to the inlet port for exhausting fluid material from the valve body. The method includes the steps of (1) controlling flow of fluid material through the valve body with a diaphragm valve, a portion of which is positioned relative to a valve seat to control fluid material flow through the valve assembly; (2) selectively applying a clamping force against the one side of the diaphragm valve in a manner sealing the diaphragm valve against a sealing surface area defined by the valve body; and (3) cleaning the sealing area of the valve body with a pressurized cleaning fluid upon sufficient reduction of the clamping force while maintaining assembly of the multipiece valve body.

Providing a valve assembly with a diaphragm valve allows the fluid material flow through the valve body to be easily controlled as a function of the position of the diaphragm valve with respect to the valve body. The provision of a second diaphragm valve for metering fluid material flow through the valve body further promotes control of the fluid material flow through the valve. The ability to internally clean the valve assembly, including the sealing area against which the diaphragm is clamped, without requiring disassembly of the valve assembly maximizes the usefulness of the valve assembly and significantly reduces production down time inherent with cleaning valve assemblies used with food products.

Numerous other features and advantages of the present invention will become readily apparent from the following detailed description, the accompanying drawings, and the appended claims.

BRIEF DESCRIPTION OF THE DRAWINGS

FIG. 1 is a longitudinal sectional view of a valve assembly according to the present invention; and FIG. 2 is an enlarged view showing a diaphragm valve of the present invention.

DETAILED DESCRIPTION OF A PREFERRED EMBODIMENT

While the present invention is susceptible of embodiment in various forms, there is shown in the drawings, and will hereinafter be described, a preferred embodiment with the understanding that the present disclosure is to be considered as an exemplification of the invention and is not intended to limit the invention to this specific embodiment illustrated.

Referring now to the drawings, there is illustrated a valve assembly 10 arranged intermediate a source of fluid material 12 and a receiving station 14. While the invention is particularly suited for use with an apparatus adapted to control the delivery of a fluid food product material such as milk, ice cream, or the like, it is not limited to the use with fluid food products as other fluids can be used with an invention of this type.

Valve assembly 10 includes a valve body 20 having at least one diaphragm valve 22 operably associated therewith. An end cap 24 is secured to the valve body as with fasteners 26. As illustrated, the diaphragm valve 22 is positioned between the valve body 20 and end cap 24. An actuator assembly 28 is provided for selectively positioning the diaphragm valve 22 relative to the valve body 20 in a manner controlling the fluid flow therethrough.

A substantially similar diaphragm valve arrangement 30 can be provided on the opposite side of the valve body 20 for further controlling the fluid material flow through the valve assembly 10. As will be recognized by those familiar with the art, valve 22 is configured to meter fluid flow, while valve 30 provides an on-off control of fluid flow. Since the diaphragm valves 22 and 30 are essentially similar for purposes of the disclosure of the present invention, only a detailed description of diaphragm valve 22 will be provided with the understanding that substantially similar structure is provided for diaphragm valve 30.

The valve body 20 defines an inlet port 32, an outlet port 34, and a fluid passage 36 which joins ports 32 and 34. The inlet port 32 permits entry of a fluid material into the valve body 20. Outlet port 34 allows fluid material to be exhausted from the valve body 20 to the associated receiving station 14. The valve body 20 further defines an annular valve seat 40 preferably arranged intermediate the inlet and outlet ports 32 and 34, respectively. Spaced outwardly from and surrounding the valve seat 40, valve body 20 further defines an annular sealing surface area 42 against which the diaphragm valve 22 is urged to retard and substantially prevent fluid from escaping between the valve body 20 and end cap 24.

The diaphragm valve 22 is operably arranged between the inlet and outlet ports 32 and 34, respectively. Each diaphragm valve is conventionally formed from a suitable elastomeric material which is capable of withstanding pressures and high temperatures involved in cleaning and/or sterilization procedures. Each diaphragm valve defines a central portion 44 which is flexible or positionable toward and away from the valve seat 40 in a manner controlling the flow of fluid material through the valve assembly. As illustrated, the central portion 44 of diaphragm valve 22 can have a conical configuration which promotes metering of the flow of fluid material past the valve seat and through the valve assembly 10.

The actuator assembly 28 is operably connected to the diaphragm valve 22 for selectively positioning the central portion 44 thereof relative to the valve seat 40 in a manner controlling flow of fluid material through the valve assembly. As illustrated, the actuator assembly 28 includes an operator controlled, linearly movable member 46 carried by end cap 24 for positioning the central portion 44 of diaphragm valve 22 relative to the valve body. Suitable seal rings 47 and 49 inhibit fluid from escaping about member 46. In one form, the operator controlled member 46 is used to position an adjustment screw 48 which acts against the central portion of the diaphragm valve in a manner controlling the relative position of the central portion 44 of the diaphragm valve with respect to the valve seat 40.

To retard flow of fluid materials between the valve body 20 and end cap 24, each diaphragm valve is clamped against the sealing surface area 42 defined by the valve body by a selectively operated clamping mechanism 50 acting against one side of the diaphragm valve 22. Such a clamping mechanism may take many forms. In the illustrated embodiment, clamping mechanism 50 includes an annular piston 52 arranged concentric with sealing surface area 42, with the piston 52 having substantially the same diameter as the sealing surface area 42. The piston 52 is arranged on one side of the diaphragm valve within an annular fluid receiving chamber 54 defined by end cap 24. The annular piston 52 is appropriately sealed to retain pneumatic pressure rearward thereof in the chamber 54 by means of a pair of conventional annular seal rings 56 and 58. Chamber 54 is connected to a suitable source of pressurized fluid 59, whereby pressurization of chamber 54 results in the piston 52 clamping and otherwise sealing the diaphragm valve 22 against its sealing surface area 42.

While the illustrated embodiment of the present valve assembly includes the annular piston 52 for effecting clamping of the diaphragm valve 22, it is presently contemplated that the use of the piston 52 is optional, and that the desired clamping effect can also be achieved by fluid pressure in the annular chamber 54 acting directly against the diaphragm valve 22.

A valve cleaning system 60 is disposed within the valve body 20 on the opposite side of each diaphragm valve 22 and 30 from its respective clamping mechanism. Preferably, the cleaning system includes an open sided annular chamber 62 defined by valve body 20. Chamber 62 is disposed outwardly from and is open on the same side of the diaphragm valve 22 as sealing surface area 42. As illustrated, annular chamber 62 can be selectively placed in communication with a pressurized source of cleaning and/or sterilizing fluid 64.

As will be understood, the valve assembly 10 is operable in either a dispensing mode of operation or a cleaning mode of operation. During the dispensing mode, the valve assembly is operated by selective positioning of diaphragm valve 22 to control the flow of fluid material from the inlet port 32 to the outlet port 34. In the cleaning mode, each diaphragm valve is positioned to permit internal cleaning of the valve assembly without requiring disassembly thereof.

During a dispensing mode of operation for the valve assembly 10, the diaphragm valve 22 is clamped against the sealing surface area 42 under the influence of the clamping mechanism 50, and fluid material is normally permitted to flow from inlet port 32 to the outlet port 34 through passage 36. When the diaphragm valve 22 is positioned under the influence of the actuator assembly 28 to close passage 36, the central portion 44 of the diaphragm valve is flexed against the valve seat 40 in a manner closing the passage 36 and thereby limiting the flow of fluid material to the outlet port 34. If so desired, the actuator mechanism may be adjusted such that the conical surface on the central portion 44 is positioned relative to the valve seat 40 to meter the fluid material flow past the valve seat and to the outlet port 34.

Figures 1, 2:
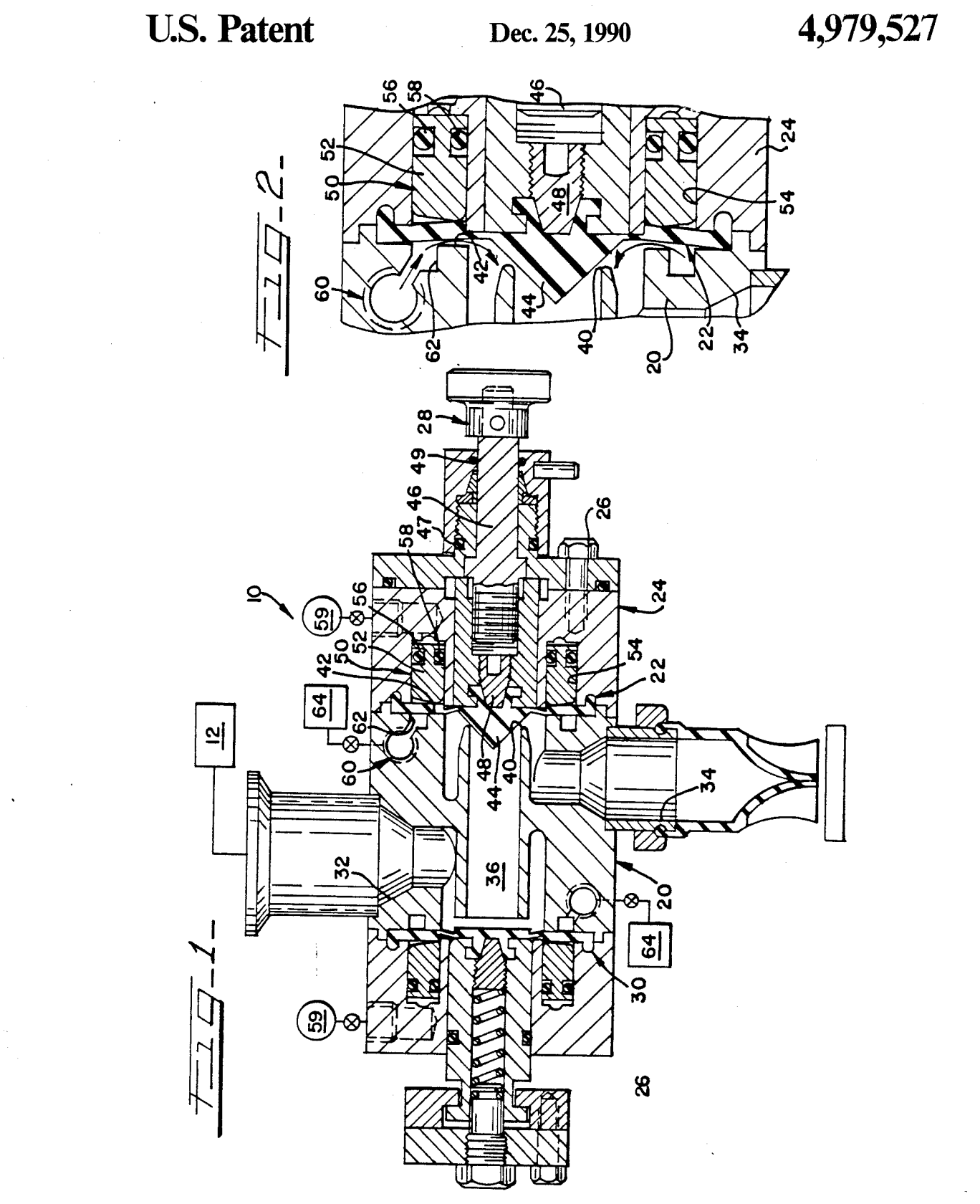

The clamping mechanism 50 normally applies a clamping force having a sufficient magnitude against one side of the diaphragm valve 22 to urge and seal the diaphragm valve 22 against the annular sealing area 42 as illustrated in FIG. 1. Thus, cleaning fluid material flowing through the valve assembly is retarded from moving or flushing past the annular sealing area 42.

The cleaning mode of operation for valve assembly 10 is effected by the release of the clamping mechanism 50. Upon release of the clamping mechanism, the cleaning system 60 is pressurized with a cleaning and sterilizing medium, such as steam, which causes the diaphragm valve 22 to lift from sealing area 42 and assume the position illustrated in FIG. 2.

In the position illustrated in FIG. 2, the diaphragm valve allows cleaning fluid to flush past the sealing surface area 42 in a manner cleaning and sterilizing same as well as the face of the diaphragm valve 22 and other internal portions of the valve assembly exposed to the cleaning fluid. The cleaning fluid from the cleaning system ultimately passes to the outlet port 34 and is discharged from the valve assembly. As will be appreciated, an important virtue of the present invention is the ability to internally clean and sterilize the valve assembly 10 without disassembly of the valve assembly. Therefore, cleaning time is minimized and valve assembly operation for production is maximized.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A valve assembly for dispensing fluid materials, said valve assembly comprising:

a valve body defining an inlet port permitting entry of fluid materials into said valve body and an outlet port joined to said inlet port for exhausting fluid materials from said valve body;

diaphragm means operably arranged between said inlet and outlet ports and including a first movable portion positionable between closed and open positions relative to a valve seat defined by said valve body for controlling flow of the fluid materials through the valve body as a function of the diaphragm means position;

means for selectively positioning said first portion of said diaphragm means relative to said valve seat;

fluid pressure operated means for selectively clamping a second portion of said diaphragm means against a sealing surface area defined by said valve body, said second portion surrounding said first portion of said diaphragm means, said clamping means acting against one side of said diaphragm means to urge said second portion of said diaphragm means into sealing engagement with said sealing surface area while simultaneously permitting movement of said first portion of said diaphragm means between said closed and open positions relative to said valve seat for controlling flow through said valve assembly; and fluid operated means disposed within said valve body and operable from the opposite side of said diaphragm means for cleaning the sealing surface area and said valve seat upon release of the fluid pressure which operates said clamping means by moving said second portion of said diaphragm means away from said sealing surface area to permit a cleaning fluid to flow between said sealing surface area and said second portion of said diaphragm means.

2. The valve assembly according to claim 1 wherein said valve body defines a passage which joins said inlet and outlet ports, and said valve assembly further includes an end cap fastened to said valve body such that said diaphragm means is positioned therebetween.

3. The valve assembly according to claim 1 wherein said clamping means includes pneumatic means for applying a clamping force against one side of said diaphragm means.

4. The valve assembly according to claim 3 wherein said pneumatic means comprises an annular chamber which is pressurized for applying said clamping force against one side of said diaphragm means, said fluid operated cleaning means comprising an open sided annular chamber positioned at said opposite side of said diaphragm means.

5. The valve assembly according to claim 1 wherein said clamping means includes pressure responsive annular piston means for applying a clamping force against one side of said diaphragm means.

6. The valve assembly according to claim 1 further including another diaphragm means arranged between said inlet and outlet ports for selectively controlling fluid flow between said inlet and outlet ports.

7. The valve assembly according to claim 6 further including means for selectively positioning said another diaphragm means relative to said valve body for controlling the flow therethrough.

8. A method of operating a valve assembly having a multipiece valve body with an inlet port for receiving fluid materials and an exhaust port joined to said inlet port for exhausting fluid materials from said valve body, said method comprising the steps of:
controlling flow of fluid material through said valve body with a diaphragm valve, said diaphragm valve including a first portion which can be positioned relative to a valve seat defined by said valve body to effect such fluid flow control;
selectively applying a clamping force, with fluid pressure, against one side of said diaphragm valve in a manner sealing a second portion of said diaphragm valve against a sealing surface area defined by said valve body so as to simultaneously permit selective positioning of said first portion relative to said valve seat to effect flow control, said second portion surrounding said first portion; and
cleaning the sealing area of said valve body and said valve seat with a pressurized cleaning fluid by release of said clamping force by release of said fluid pressure for moving said second portion of said diaphragm valve away from said sealing surface area to permit said cleaning fluid to flow between said sealing surface area and said second portion of said diaphragm valve while maintaining assembly of said multipiece valve body.

9. The method of operating a valve assembly according to claim 8 further comprising the steps of:
controlling the flow of fluid material through said valve body with another diaphragm valve which is selectively positioned relative to said valve body.

10. A valve assembly for controlling fluid flow, comprising:
a valve body defining an inlet port for receiving a fluid into said valve body, and an outlet port which can be joined in fluid communication with said inlet port for permitting fluid flow out of said valve body;
diaphragm means operably arranged between said inlet and outlet ports and including a first, movable portion which can be selectively positioned relative to a valve seat defined by said valve body for controlling fluid flow through said valve body from said inlet port to said outlet port;
means for selectively positioning said first portion of said diaphragm means relative to said valve seat for controlling fluid flow;
means for selectively clamping a second portion of said diaphragm means, which surrounds said first portion, against a sealing surface area of said valve body generally surrounding said valve seat, said clamping means acting against one side of said diaphragm means to urge said second portion of said diaphragm means into sealing arrangement with said sealing surface area while simultaneously permitting movement of said first portion of said diaphragm means relative to said valve seat for controlling flow through said valve assembly; and
fluid operated cleaning means disposed within said valve body and operable from an opposite side of said diaphragm means for cleaning said sealing surface area and said valve seat upon release of said clamping means by directing a cleaning fluid inwardly of said diaphragm means past said second portion thereof toward said first portion thereof.

11. The valve assembly according to claim 10, wherein
said clamping means comprises fluid pressure actuating means for applying said clamping force on said diaphragm means.

12. The valve assembly according to claim 11, wherein
said fluid pressure actuated means comprises an annular chamber defined by said valve body which can be pressurized for applying said clamping force.

13. The valve assembly according to claim 12, wherein
said fluid pressure actuated means further comprises an annular piston positioned adjacent said diaphragm means in said annular chamber which can be urged against said diaphragm means by fluid pressurization of said annular chamber.

* * * * *